(12) United States Patent
Porte et al.

(10) Patent No.: US 8,960,589 B2
(45) Date of Patent: Feb. 24, 2015

(54) PANEL FOR AN AIR INTAKE OF AN AIRCRAFT NACELLE THAT ENSURES OPTIMIZED ACOUSTIC TREATMENT AND FROST TREATMENT

(75) Inventors: Alain Porte, Colomiers (FR); Frédéric Chelin, Encausse (FR); Stéphane Dida, Fontenilles (FR); Arnaud Hormiere, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 441 days.

(21) Appl. No.: 12/968,562

(22) Filed: Dec. 15, 2010

(65) Prior Publication Data

US 2011/0139927 A1 Jun. 16, 2011

(30) Foreign Application Priority Data

Dec. 15, 2009 (FR) ...................... 09 58973

(51) Int. Cl.
| | | |
|---|---|---|
| B64C 23/00 | (2006.01) | |
| B64D 15/04 | (2006.01) | |
| B64D 33/02 | (2006.01) | |
| F02C 7/045 | (2006.01) | |
| F02C 7/047 | (2006.01) | |

(52) U.S. Cl.
CPC ............. B64D 15/04 (2013.01); B64D 33/02 (2013.01); F02C 7/045 (2013.01); F02C 7/047 (2013.01); B64D 2033/0206 (2013.01); B64D 2033/0233 (2013.01); Y02T 50/672 (2013.01); F05D 2260/962 (2013.01)
USPC ........................................ 244/1 N; 244/134 B

(58) Field of Classification Search
USPC .............. 244/134 B, 1 N, 53 B, 123.1, 123.5, 244/123.6, 123, 123.13, 123.12, 133; 60/39.091, 39.093; 415/47, 177; 416/39; 137/15.1
See application file for complete search history.

(56) References Cited

U.S. PATENT DOCUMENTS

| 3,933,327 A | * | 1/1976 | Cook et al. ................. 244/134 B |
| 4,257,998 A | * | 3/1981 | Diepenbrock et al. ........ 264/156 |
| 4,749,150 A | * | 6/1988 | Rose et al. ................... 244/53 B |

(Continued)

FOREIGN PATENT DOCUMENTS

| EP | 1103462 A1 | 11/2000 |
| EP | 1232945 A1 | 8/2002 |

(Continued)

OTHER PUBLICATIONS

French Search Report, dated Jul. 13, 2010, from corresponding French application.

*Primary Examiner* — Rob Swiatek
*Assistant Examiner* — George Andonyan
(74) *Attorney, Agent, or Firm* — Young & Thompson

(57) ABSTRACT

An acoustic treatment panel includes an acoustically resistive layer that defines a surface of an aircraft that is in contact with an aerodynamic stream, a reflective layer (50) between which are arranged at least one alveolar structure (52) with a number of cells dedicated to the acoustic treatment, and de-icing cavities (58) in which hot air circulates in contact with the acoustically resistive layer to ensure a frost treatment, characterized in that it includes holes for supplying de-icing cavities (58) with hot air and in that the capacity to treat the frost is adjusted along the zones by modifying the open surface ratio that results from the holes.

20 Claims, 3 Drawing Sheets

(56) References Cited

U.S. PATENT DOCUMENTS

| | | | |
|---|---|---|---|
| 5,011,098 A * | 4/1991 | McLaren et al. | 244/134 B |
| 5,841,079 A | 11/1998 | Parente | |
| 6,050,523 A * | 4/2000 | Kraenzien | 244/123.1 |
| 6,457,676 B1 * | 10/2002 | Breer et al. | 244/134 R |
| 6,688,558 B2 * | 2/2004 | Breer et al. | 244/134 R |
| 6,827,180 B2 * | 12/2004 | Wilson | 181/292 |
| 7,331,421 B2 * | 2/2008 | Olsen et al. | 181/214 |
| 7,946,385 B2 * | 5/2011 | Lalane et al. | 181/296 |
| 2002/0139900 A1 * | 10/2002 | Porte et al. | 244/134 C |
| 2008/0179448 A1 * | 7/2008 | Layland et al. | 244/1 N |
| 2010/0096213 A1 | 4/2010 | Frustie et al. | |
| 2010/0181420 A1 * | 7/2010 | Porte et al. | 244/1 N |
| 2010/0252685 A1 * | 10/2010 | Porte et al. | 244/134 B |
| 2010/0276548 A1 * | 11/2010 | Porte et al. | 244/53 B |
| 2010/0301161 A1 * | 12/2010 | Chene et al. | 244/1 N |
| 2012/0048389 A1 * | 3/2012 | Chelin et al. | 137/15.1 |

FOREIGN PATENT DOCUMENTS

| | | |
|---|---|---|
| FR | 2912781 A1 | 8/2008 |
| FR | 2917067 A1 | 12/2008 |
| FR | 2925463 A1 | 6/2009 |
| GB | 601086 A | 4/1948 |

* cited by examiner

PANEL FOR AN AIR INTAKE OF AN AIRCRAFT NACELLE THAT ENSURES OPTIMIZED ACOUSTIC TREATMENT AND FROST TREATMENT

This invention relates to a panel that is more particularly suited for an air intake of an aircraft nacelle that ensures optimized acoustic treatment and frost treatment.

BACKGROUND OF THE INVENTION

In a known manner, as illustrated in FIG. 1, a propulsion system of an aircraft, for example connected under the wing by means of a mast, comprises a nacelle 14 in which a power plant that drives a fan 16 is arranged in an essentially concentric manner. The longitudinal axis of the nacelle is referenced 18.

The nacelle 14 comprises an inside wall that delimits a pipe with an air intake at the front.

To limit the impact of noise pollution close to airports, techniques have been developed to reduce the noise emitted by an aircraft, and in particular the noise that is emitted by a propulsion system, by arranging, at the walls of the pipes, panels, coverings or structures whose purpose is to absorb a portion of the sound energy, in particular by using the principle of Helmholtz resonators. In a known manner, a panel for the acoustic treatment comprises—from the outside to the inside—an acoustically resistive porous layer, at least one alveolar structure, and a reflective or impermeable layer.

For the moment, because of various constraints, for example shaping or compatibility with other equipment, the coverings are provided in particular at the inside wall of the nacelle in a limited zone that is distant from the air intake and the air discharge.

To increase the effectiveness of the acoustic treatment, one solution consists in expanding the surfaces that are covered by the acoustic covering and in extending it at the level of the air intake. However, at the air intake or the lip of the nacelle, the acoustic treatment should not affect the operation of systems that make it possible to prevent the formation and/or the accumulation of ice and/or frost that are necessary in these zones.

These systems are divided into two families, the first called defrosting systems that make it possible to limit the formation of ice and/or frost, and the second called de-icing systems that limit the accumulation of ice and/or frost and that act once the ice and/or frost is formed. Hereinafter, a frost treatment system is defined as a defrosting system or a de-icing system, the term frost encompassing frost or ice.

This invention relates more particularly to a frost treatment process that consists in using the hot air that is taken from the engine and fed back at the inside wall of the leading edges.

According to an embodiment that is known and illustrated in FIG. 2, a nacelle 14 comprises, on the inside, a partition that is called a front frame 24 that with the air intake 22 delimits a pipe 26 that extends over the entire circumference of the nacelle and that has an essentially D-shaped cross-section.

This pipe 26 is supplied with hot air by a system of nozzles or a feed pipe 28 that is located at a point. This hot air makes a 360° passage around the leading edge, and besides a centrifugal effect, the hot air circulates on the outer side of the leading edge as illustrated in FIG. 3B, on which the de-icing capacity was shown as a function of s, with s=0 corresponding to the top part of the air intake as illustrated in FIG. 2, the value of s being positive and increasing on the outer side of the nacelle based on distance from point 0 and the value of s being negative and increasing by absolute value on the inner side of the nacelle based on distance from point 0.

If hot air is injected at a point that is located at 180° (0 corresponding to the highest point of the nacelle), a de-icing capacity is obtained that is not homogeneous over the circumference that quickly expands to reach a maximum value at 220°, and then a gradual reduction over the remainder of the circumference, as illustrated in FIG. 3B. Thus, a discontinuity of frost treatment at the lowest level is noted.

However, as illustrated in FIGS. 4A and 4B, the zone that requires the most significant frost treatment is located at the inside edge of the air intake over the entire circumference to limit the risk for the power plant of ingesting ice particles.

In the case of an acoustic treatment at the air intake, as illustrated in FIG. 2, an acoustic treatment panel 30 is to be placed at the level of the inner side of the nacelle that is also the zone that should be treated most effectively relative to the frost.

However, the acoustic treatment panel 30 that consists of air-containing cells acts as a thermal insulator that limits the effect of the frost treatment. One solution then consists in increasing the temperature of the air of the frost treatment so as to effectively treat the air intake. However, to withstand significant temperatures, it is advisable to use materials whose mass is higher than that of composite materials; this tends to increase the on-board mass and therefore the energy consumption of the aircraft.

So as to attempt to make acoustic and frost treatments compatible, one solution described in the documents EP-1,103,462 and U.S. Pat. No. 5,841,079 provides holes in the reflective wall so that the hot air penetrates into the cells of the acoustic covering.

However, this solution is not satisfactory for the following reasons:

The cells of the alveolar structure that comprise one or more holes at the reflective layer are less capable in terms of acoustic treatment, with the waves dissipating less well in said cells. To reduce this alteration, one solution consists in reducing the cross-sections of holes. In this case, the air volume at a constant flow rate is reduced, making the de-icing less effective. Furthermore, these holes with reduced cross-sections can be plugged more easily, which eliminates the de-icing function in the corresponding zone.

The document EP-1,232,945 describes an acoustic treatment that comprises an acoustically resistive porous layer, a reflective layer, and, between the two, an alveolar structure that comprises a number of clusters of cells. Thus, according to this document, the acoustic treatment is performed at cell clusters, and the frost treatment enters the cell clusters.

According to one embodiment, the clusters come in the form of strips of cells that are parallel to one another and perpendicular to the longitudinal axis 18 of the nacelle, whereby each strip is delimited by two lateral partitions. With the strips being spaced apart, a passage that is bordered by the side walls of the strips is obtained between two adjacent strips. According to a first variant, a reflective layer that is common to all of the strips and scoops for introducing air into the passages is provided. According to another variant, each strip comprises a reflective layer, a bent part being provided to cover several strips.

Even if it makes it possible to make an acoustic treatment co-exist with a frost treatment, this solution does not make it possible to optimize the frost treatment in the most sensitive zones.

According to another significant constraint, the alveolar structures should be relatively airtight between two points that are spaced apart in the longitudinal direction so as not to create an air flow between these two points inside the acoustic treatment panel that can generate a perturbed stream at the aerodynamic surface.

SUMMARY OF THE INVENTION

The purpose of this invention is to remedy the drawbacks of the prior art by proposing an acoustic treatment panel that is more particularly suitable for an air intake of an aircraft nacelle that ensures optimized acoustic treatment and frost treatment.

For this purpose, the invention has as its object an acoustic treatment panel that comprises an acoustically resistive layer that defines a surface of an aircraft that is in contact with an aerodynamic stream, a reflective layer between which are arranged at least one alveolar structure with a number of cells dedicated to the acoustic treatment, and de-icing cavities in which hot air circulates in contact with said acoustically resistive layer to ensure a frost treatment, characterized in that it comprises holes for supplying de-icing cavities in hot air and in that the capacity to treat the frost is adjusted in the zones by modifying the open surface ratio that is associated with the holes.

BRIEF DESCRIPTION OF THE DRAWINGS

Other characteristics and advantages will emerge from the following description of the invention, a description that is provided only by way of example, relative to the accompanying drawings, in which.

DETAILED DESCRIPTION OF THE PREFERRED EMBODIMENTS

This invention is now described applied to an air intake of a propulsion system of an aircraft. However, it is not limited to this application and may be suitable for other zones of an aircraft comprising an acoustic treatment panel that is to co-exist with a frost treatment that uses hot air.

Figure 1:
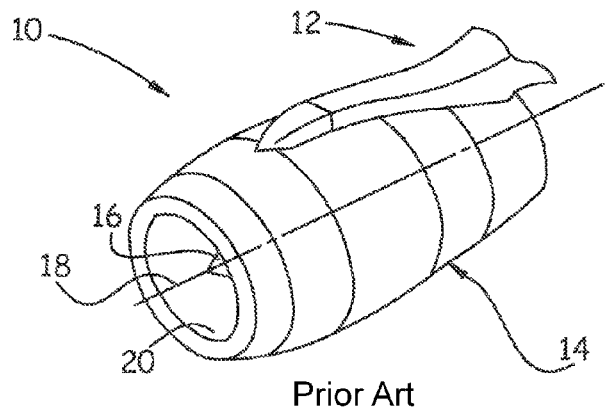
FIG. 1 is a perspective view of an aircraft nacelle.
Figure 2:
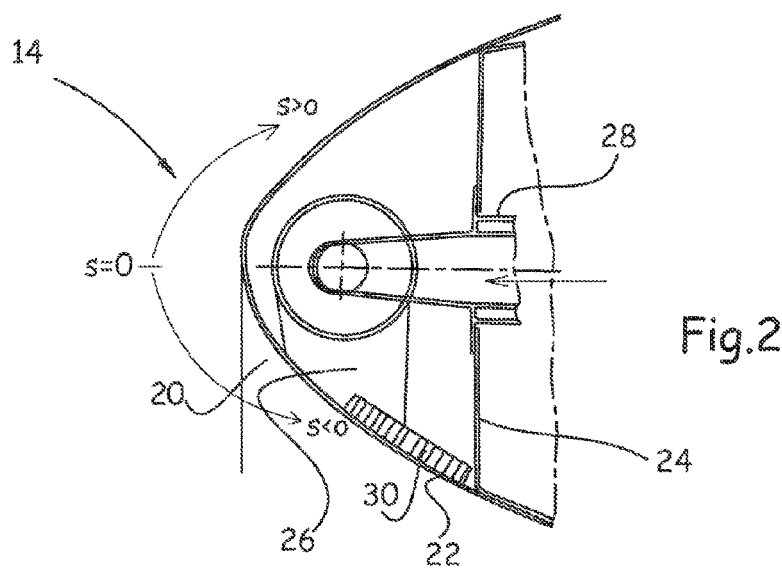
FIG. 2 is a cutaway along a longitudinal plane of the front of a nacelle.
Figure 3A:
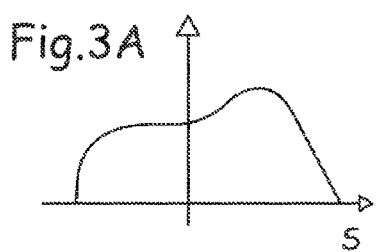
FIG. 3A is a diagram that illustrates the capacity to treat the frost according to the prior art in a longitudinal plane of a nacelle.
Figure 3B:
FIG. 3B is a diagram that illustrates the capacity to treat the frost according to the prior art along the circumference of an air intake of a nacelle.
Figure 4A:
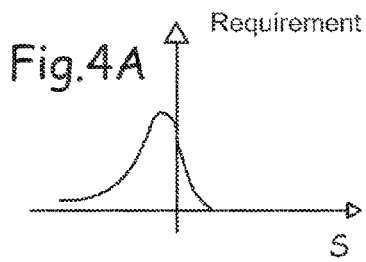
FIG. 4A is a diagram that illustrates the frost treatment requirements in a longitudinal plane of a nacelle.
Figure 4B:
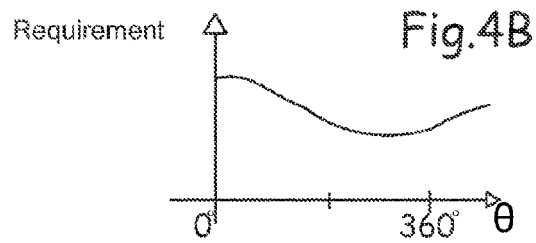
FIG. 4B is a diagram that illustrates the frost treatment requirements along the circumference of an air intake of a nacelle.
Figure 5:
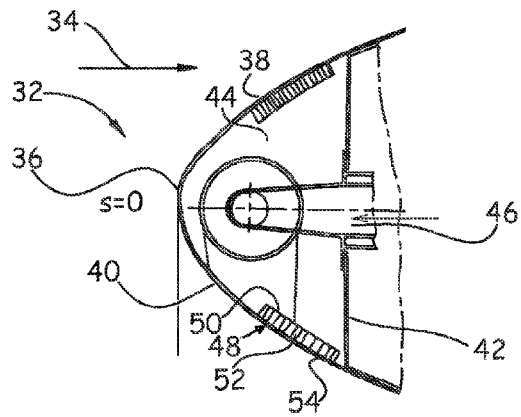
FIG. 5 is a cutaway along a longitudinal plane of the front of a nacelle according to the invention.

FIG. 5 shows an air intake 32 of an aircraft nacelle.

The air intake makes it possible to channel an air stream referenced by the arrow 34 to the power plant.

The front part 36 of the air intake 32 describes an essentially circular shape that extends in a plane that can be essentially perpendicular to the longitudinal axis, or not perpendicular, with the front part that is located just before 12 o'clock. However, other forms of air intake can be considered.

According to the dimensions of the nacelle, the air intake can comprise a first small curvature radius that corresponds essentially to the radius of the inside pipe of the nacelle in a plane that is perpendicular to the longitudinal direction as well as a second small curvature radius in a longitudinal plane.

Hereinafter, aerodynamic surface is defined as the shell of the aircraft that is in contact with the aerodynamic stream.

As illustrated in FIG. 5, the intersection between a longitudinal plane and the front part 36 corresponds to the point s=0, whereby the value of s is positive and increases on the outer side 38 of the nacelle based on distance to point s=0, and the value of s being negative and increasing in absolute value on the inner side 40 of the nacelle based on distance to point s=0.

The invention relates more particularly to a frost treatment that consists in using the hot air that is sampled at the power plant.

According to one embodiment, a nacelle comprises a partition that is called a front frame 42 that with the air intake 32 delimits a pipe 44 that is called a D-shaped pipe that extends over the entire circumference of the nacelle and that has a D-shaped cross-section.

According to one embodiment, this D-shaped pipe 44 is supplied with hot air by a system of nozzles or a feed pipe 46 that is located at one point.

However, the invention is not limited to this type of pipe or to this type of hot air supply.

To limit the impact of pollution, an acoustic treatment panel 48 whose purpose is to absorb a portion of the sound energy, in particular by using the principle of Helmholtz resonators, is provided at the level of the aerodynamic surfaces of the inner side 40 of the air intake in the D-shaped pipe 44. In a known manner, this acoustic treatment panel 48, also called an acoustic panel, comprises—from the inside to the outside—a reflective layer 50, an alveolar structure 52, and an acoustically resistive layer 54.

As a variant, the structure for the acoustic treatment 48 can comprise several alveolar structures that are separated by acoustically resistive layers that are called a septum.

The invention is not limited to an air intake. It relates to all of the acoustic treatment panels that are arranged at an aerodynamic surface on the plane that have to be treated for frost by using hot air.

Figure 6:
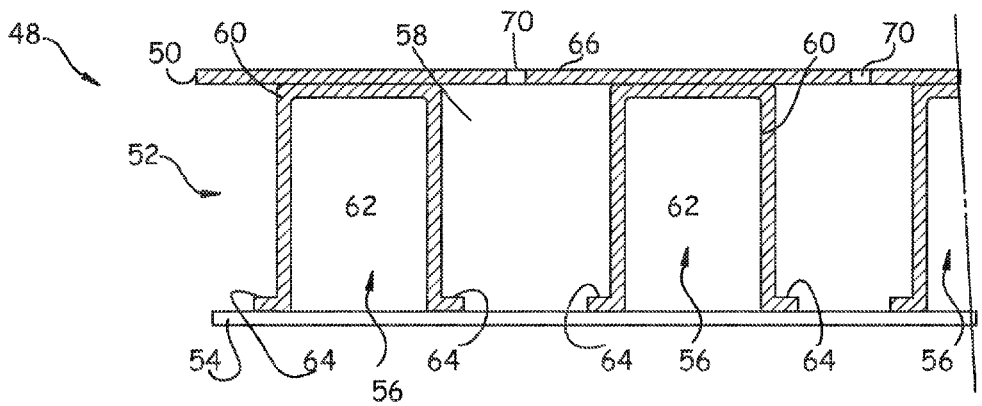
FIG. 6 is a cutaway that illustrates in detail the acoustic treatment panel according to the invention.

According to an embodiment that is illustrated in FIG. 6, the alveolar structure comprises strips 56 that are spaced apart in such a way as to delimit—between two adjacent strips—a passage that is in contact with the aerodynamic surface that is to be de-iced. According to this embodiment, each strip comprises at least two elements, a first element 60 that with the acoustically resistive layer 54 delimits a chamber 62 into which walls are placed in such a way as to form cells. Advantageously, the first element comes in the form of a section with a U-shaped cross-section of which the ends of the branches are made integral with the acoustically resistive layer 54. To improve the sealing between the strips, the ends of the U each comprise a dropped edge 64 that is flattened against the acoustically resistive layer 54. According to this configuration, the base of the U ensures the function of the reflective layer.

At least one rear wall 66 is provided to delimit—with the strips and the acoustically resistive layer—a de-icing pipe 58 that is in contact with the aerodynamic wall to be de-iced.

Figure 9:
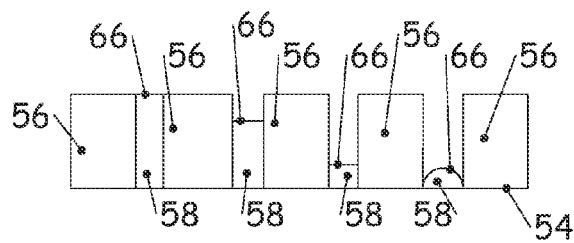
FIG. 9 is a cutaway that illustrates an acoustic treatment panel that illustrates a third means for adjusting the distribution of the capacity to treat the frost according to the invention.

According to the variants, a rear wall 66 can be provided for several de-icing pipes 58 as illustrated in FIG. 6, or a rear wall 66 is provided for each de-icing pipe 58 as illustrated in FIG. 9.

Figure 11:
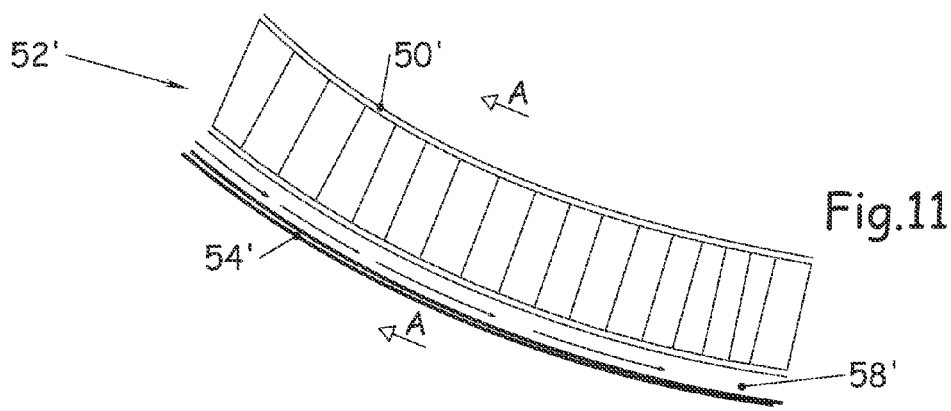
FIG. 11 is a cutaway along a longitudinal plane of an acoustic treatment panel according to one embodiment.
Figure 12:
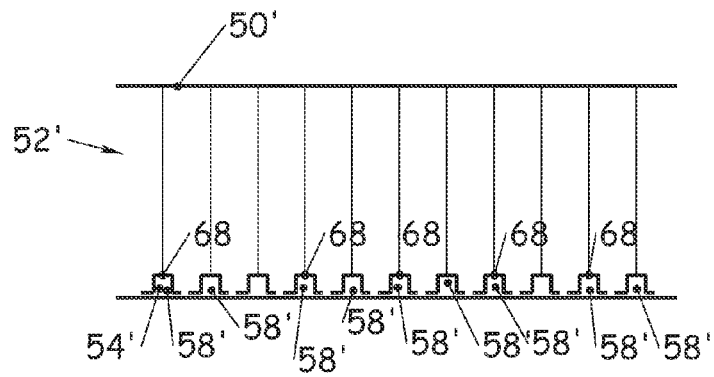
FIG. 12 is a cutaway along the line A-A of the acoustic treatment panel illustrated in FIG. 11.

According to another embodiment that is illustrated in FIGS. 11 and 12, the acoustic treatment panel comprises a reflective layer 50', at least one alveolar structure 52', and at least one acoustically resistive layer 54'. According to this embodiment, the de-icing pipes 58' are delimited by a partition 68 that comes in the form of a section with a U-shaped, V-shaped, or omega-shaped cross-section or the like of which the branches are made integral with the acoustically resistive layer 54'. Preferably, the ends of the branches of the section comprise a fallen edge to ensure a tight connection with the acoustically resistive layer. The alveolar structure 52' comprises suitable cutaways for housing the de-icing pipes 58'.

According to another embodiment, the alveolar structure can comprise a cell from a first family or a group of cells from the first family dedicated to the frost treatment in which the hot air circulates, whereby said cell or said group of cells is isolated from the other cells of a second family that is dedicated to the acoustic treatment, with the cells from the first family or the groups of cells from the first family able to be connected to one another or respectively connected to one another in such a way as to allow the circulation of the hot air in the cells of the first family dedicated to the frost treatment.

In a general manner, the acoustic panel comprises a reflective layer, at least one acoustically resistive layer in contact with an aerodynamic air stream, between which are arranged at least one alveolar structure with cells that are dedicated to the acoustic treatment and so-called de-icing cavities in which the hot air circulates, isolated from the cells that are dedicated to the acoustic treatment.

Hereinafter, de-icing cavity is defined as a pipe, a cell, a group of cells, or another hollow form that is in contact with the acoustically resistive layer, itself in contact with the aerodynamic stream.

According to these variants, it is noted that the de-icing cavities 58, 58' are isolated from the cells that are provided for the acoustic treatment and that thus the frost treatment does not interfere with the acoustic treatment.

Advantageously, when the de-icing cavities come in the form of de-icing pipes, the latter are oriented perpendicular to the longitudinal axis of the nacelle. According to this configuration, when the cells that are provided for the acoustic treatment are partitioned in the U-shaped strips as illustrated in FIG. 6, the risk of leakage inside the nacelle between two points that are spaced apart is limited in the longitudinal direction of the alveolar structure, and therefore the risk of generating a stream that is perturbed at the aerodynamic surface is limited.

As a variant, as illustrated in FIG. 11, the de-icing pipes can be arranged in a longitudinal direction or with an acute angle relative to this longitudinal direction.

Supply means are provided for supplying the de-icing cavities 58, 58'. In the case of the configuration that is illustrated in FIGS. 11 and 12, hot air is supplied at one end of each de-icing pipe 58', for example by means of a collector.

In the case of the configuration that is illustrated in FIGS. 5 and 6, hot air is also supplied by the ends of the pipes.

According to another embodiment, the acoustic treatment panel can be arranged in a cavity or a chamber that contains hot air. In this case, hot air is supplied via holes 70 in the wall(s) that isolate the de-icing cavities 58 from the chamber that contains the hot air.

According to the invention, the capacity to treat the frost is not constant over the entire surface of the acoustic panel. Thus, certain zones of the acoustic treatment panel can have a capacity to treat the frost that is larger than others. The capacity to treat the frost at a given point varies in at least one direction. Thus, the capacity to treat the frost at a given point is adapted based on the variable s and/or based on the angular variable $\theta$, $\theta$ varying in a plane that is perpendicular to the longitudinal axis from 0 to 360°, with 0 corresponding to the highest position.

Figure 13:
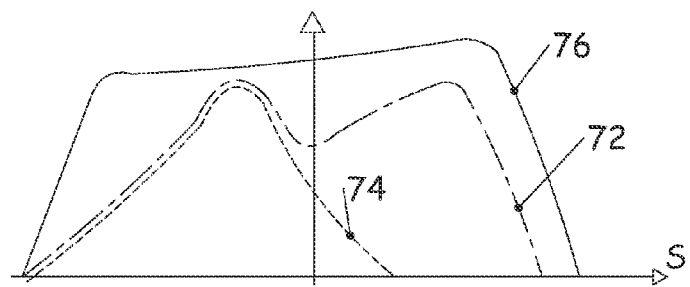
FIG. 13 is a diagram that illustrates the capacity to treat the frost in a longitudinal plane of a nacelle.

Thus, as illustrated in FIG. 13, there is a tendency to increase the capacity to treat the frost on the inner side 40 of the nacelle so as to make the actual curve 72 of the de-icing capacity correspond to the curve 74 of the de-icing requirements. In addition, relative to the solution of the prior art that corresponds to the curve 76 of the de-icing capacity, the capacity to treat the frost on the outer side 38 of the nacelle is considerably reduced.

It is noted that the surface inside the curve 72 is considerably less than the surface inside the curve 76, which corresponds to a lower total de-icing capacity according to the invention relative to the prior art and therefore to a reduction in power that is necessary. This reduction in power results from a more targeted action of the frost treatment that is performed in the most sensitive zones.

Figure 8:
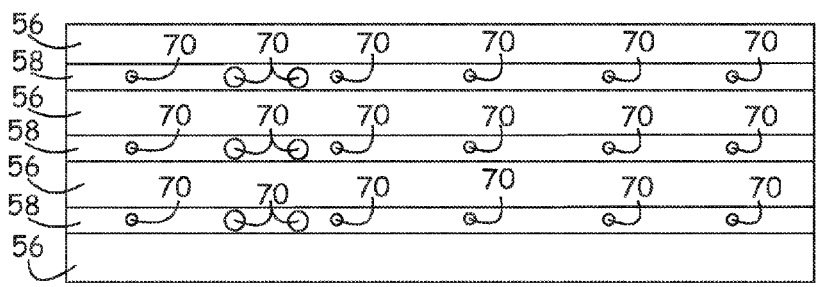
FIG. 8 is a view of the reflective layer that illustrates a second means for adjusting the distribution of the capacity to treat the frost according to the invention.

The de-icing capacity is modulated according to a given zone by modifying the dimensions of the de-icing cavity and/or by modifying the open surface ratio that results from the holes 70 as illustrated in FIG. 8 and/or by modifying the distance that separates the holes 70 of the acoustically resistive layer to be treated on the frost plane.

In the case of de-icing pipes, the de-icing capacity is modulated by modifying the cross-section of at least one de-icing pipe as illustrated in FIG. 9, or by modulating its height or its width. Thus, the side walls of the pipe (perpendicular to the acoustically resistive layer) cannot be parallel, and their spacing can vary depending on the zone and the de-icing capacity requirements of said zone.

Figure 10:
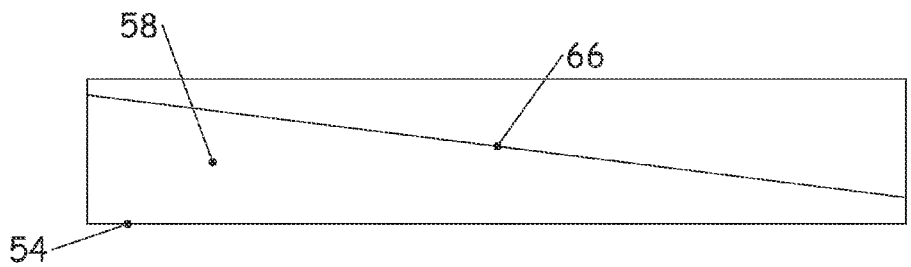
FIG. 10 is a cutaway that illustrates an acoustic treatment panel that illustrates a fourth means for adjusting the distribution of the capacity to treat the frost according to the invention.

As illustrated in FIG. 10, the cross-section of the de-icing pipe cannot be constant over the entire length of the pipe.

According to the configuration that is illustrated in FIGS. 11 and 12, it is possible to adjust the capacity to treat the frost by modulating the cross-section of the de-icing pipes 58'.

The open surface ratio that results from the holes 70 can vary by adjusting the density of the holes 70 and/or by adjusting the diameter of the holes 70.

According to a characteristic of the invention, in a given longitudinal plane, the open surface ratio that results from the holes 70 is greater for the zone that corresponds to s<0 relative to the zone that corresponds to s>0.

Figure 7:
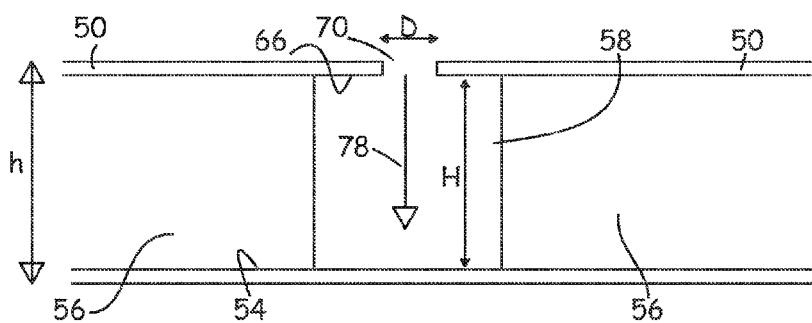
FIG. 7 is a cutway that illustrates a first means for adjusting the distribution of the capacity to treat the frost according to the invention.

Preferably, the variant with holes 70 in the partition(s) that separate(s) the de-icing pipes 58 from the remainder of the D-shaped pipe 44 for supplying said pipes will be preferred. Actually, this solution makes it possible to obtain—for each hole 70—a jet 78 (visible in FIG. 7) that impacts the inner surface of the wall that is to be treated. This solution makes it possible to obtain a heat exchange coefficient that is larger than a stream that flows parallel to the wall that is to be treated.

According to this configuration, it is possible to adjust the surface distribution of the capacity to treat the frost by varying D—the diameter of the hole 70—and/or H—the distance separating the hole 70 from the wall that is to be treated.

Thus, the capacity to treat the frost increases when the diameter D increases and/or the height H decreases.

The invention claimed is:

1. An acoustic treatment panel, comprising:
   an acoustically resistive layer that defines an outer surface of an aircraft that is in contact with an aerodynamic stream;
   a reflective layer; and
   at least one alveolar structure located between the acoustically resistive layer and the reflective layer, the at least one alveolar structure comprising a plurality of cells configured for acoustic treatment,
   the cells being formed of elongated strips extending parallel to one another, each of the strips being delimited by two opposite side partitions and each of the strips being spaced apart from one another to form elongated de-icing cavities extending in between adjacent strips such that, during operation, hot air circulates through the de-icing cavities in contact with said acoustically resistive layer for frost treatment,
   wherein a rear wall, extending from opposite facing side partitions of the adjacent strips and enclosing each of the de-icing cavities between the strips, includes holes in communication with each de-icing cavity for supplying each de-icing cavity with hot air, and
   wherein along an entire length of the rear wall over any one de-icing cavity, a ratio of open space formed by the holes to a closed area of the rear wall along the length varies irregularly to delimit zones having differing communication with the hot air for differing capacities for frost treatment.

2. The acoustic treatment panel according to claim 1, wherein dimensions of any one de-icing cavity varies in a lengthwise direction in order to vary a capacity to treat frost.

3. The acoustic treatment panel according to claim 2, wherein, along the length of the rear wall over any one de-icing cavity, at least one of size and spacing of the holes vary with respect to each other.

4. The acoustic treatment panel according to claim 2, along the length of any one de-icing cavity, a distance separating the rear wall from the acoustically resistive layer varies in order to vary a capacity to treat frost.

5. The acoustic treatment panel according to claim 1, wherein, along the length of the rear wall over any one de-icing cavity, at least one of size and spacing of the holes vary with respect to each other.

6. The acoustic treatment panel according to claim 5, along the length of any one de-icing cavity, a distance separating the rear wall from the acoustically resistive layer varies in order to vary a capacity to treat frost.

7. The acoustic treatment panel according to claim 1, wherein, along the length of any one de-icing cavity, a distance separating the rear wall from the acoustically resistive layer varies in order to vary a capacity to treat frost.

8. An air intake of an aircraft nacelle comprising:
   a pipe that extends over a circumference of said air intake and configured to be supplied with hot air for treating frost; and
   an acoustic treatment panel according to claim 1.

9. The air intake of an aircraft nacelle according to claim 8, wherein a capacity to treat the frost varies in accordance with a variable "s" in a longitudinal plane so as to increase the capacity of de-icing at a level of an inner side of the air intake and to reduce an effect of centrifugal force.

10. The air intake of an aircraft nacelle according to claim 9, wherein a capacity to treat the frost varies in accordance with an angular variable theta ($\theta$) along a circumference of the air intake.

11. The air intake of an aircraft nacelle according to claim 9, wherein, for a given longitudinal plane, the ratio of open surface of the holes to a remaining closed surface along the length of the rear wall over any one de-icing cavity is larger on an inner side of the nacelle relative to an outer side of the nacelle.

12. The air intake of an aircraft nacelle according to claim 8, wherein a capacity to treat the frost varies in accordance with an angular variable theta ($\theta$) along a circumference of the air intake.

13. The air intake of an aircraft nacelle according to claim 12, wherein, for a given longitudinal plane, the ratio of open surface of the holes to a remaining closed surface along the length of the rear wall over any one de-icing cavity is larger on an inner side of the nacelle relative to an outer side of the nacelle.

14. The air intake of an aircraft nacelle according to claim 8, wherein, for a given longitudinal plane, the ratio of open surface of the holes to a remaining closed surface along the length of the rear wall over any one de-icing cavity is larger on an inner side of the nacelle relative to an outer side of the nacelle.

15. An acoustic treatment panel, comprising:
   an acoustically resistive layer provided as an outer surface of an aircraft to be in contact with an aerodynamic stream;
   a reflective layer facing opposite a surface of the acoustically resistive layer; and
   at least one alveolar structure, comprising a plurality of elongated strips sandwiched between the acoustically resistive layer and the reflective layer and extending parallel to one another to form cells configured for acoustic treatment,
   each of the strips extending in a lengthwise direction and having a U-shaped cross section comprising two branches extending from opposite ends of a connecting element spanning a distance between the two branches, each of the two branches having an end connected to the acoustically resistive layer to form a chamber inside the strip,
   each of the strips being spaced apart from each other to form de-icing pipes within gaps between adjacent strips, each of the de-icing pipes extending along the lengthwise direction and delimited by opposite-facing branches of adjacent strips, the acoustically resistive layer, and a rear wall spanning between each of the adjacent strips to enclose the de-icing pipes within the gaps between the adjacent strips,
   wherein the rear wall has holes in communication with the de-icing pipes for passage of hot air to a surface of the acoustically resistive layer inside the de-icing pipes for frost treatment, and
   wherein, for any one de-icing pipe, a ratio of an area of the open space formed by the holes through the rear wall to a closed area of the rear wall between the holes varies irregularly along a longitudinal length of the de-icing pipe to delimit zones within the de-icing pipe having differing capacities for frost treatment.

16. The acoustic treatment panel according to claim 15, wherein each of the ends of the branches of the strips comprises a dropped edge flattened against the acoustically resistive layer.

17. The acoustic treatment panel according to claim 15, wherein the reflective layer is located directly on top of the connecting elements of each of the strips.

18. The acoustic treatment panel according to claim 15, wherein dimensions of any one de-icing pipe varies along the lengthwise direction.

19. The acoustic treatment panel according to claim 15, wherein, along a length of the rear wall over any one de-icing cavity, the holes vary with respect to one another in terms of any one of size and spacing.

20. The acoustic treatment panel according to claim 15, wherein, along a length of the rear wall over any one de-icing cavity, the holes vary with respect to one another in terms of size and spacing.

* * * * *